June 12, 1923.
W. TONKE
POTATO FORK
Original Filed Sept. 22, 1913
1,458,910
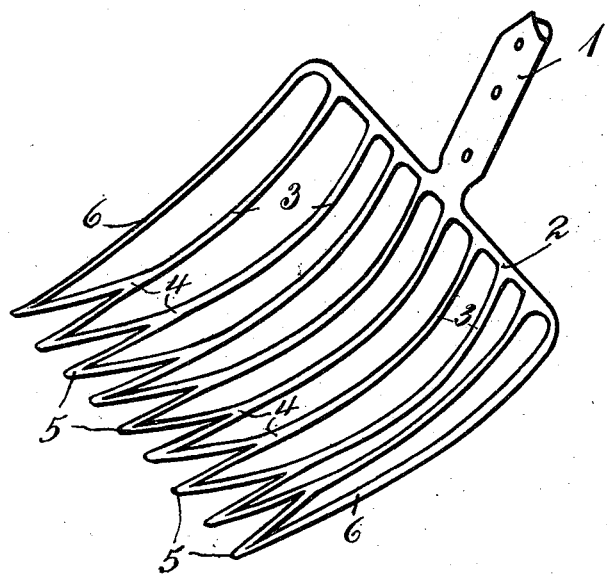

Patented June 12, 1923.

1,458,910

UNITED STATES PATENT OFFICE.

WILHELM TONKE, OF MITTELSTEINE, GERMANY, ASSIGNOR TO FIRM: ROEDER & CO., OF HANOVER, GERMANY.

POTATO FORK.

Application filed September 22, 1913, Serial No. 791,092. Renewed April 7, 1923.

*To all whom it may concern:*

Be it known that I, WILHELM TONKE, a subject of the King of Prussia, German Emperor, residing at Mittelsteine, in the Kingdom of Prussia, German Empire, have invented certain new and useful Improvements in a Potato Fork, of which the following is a specification.

This invention relates to a fork for shovelling potatoes.

In the accompanying drawings the improved shovel fork is shown seen from above.

The fork consists of the usual socket 1 in which the handle is to be fixed, of a hand bar 2, of curved prongs 3 which have thickened parts 4. Each prong 3 is provided at the front end with two arms, one arm of each adjacent prong being connected to form a head 5.

The prongs 3 are of oval cross section and they are reinforced at the part 4 designed to come in contact with the ground.

I claim:—

1. In a potato shovel in combination, a transverse bar and slightly curved slender prongs extending substantially at right angles to said bar parallel to one another, the ends of said prongs being bifurcated and adjoining arms of said prong ends being united to form V-shaped points.

2. In a potato shovel in combination, a transverse bar and slightly curved slender prongs extending substantially at right angles to said bar parallel to one another, the ends of said prongs being bifurcated the points of bifurcation being reinforced and adjoining arms of said prong ends being united to form V-shaped points.

In witness whereof I have hereunto set my hand in the presence of two witnesses.

WILHELM TONKE.

Witnesses:
HANS GELLNER,
ERNST ETZ.